UNITED STATES PATENT OFFICE.

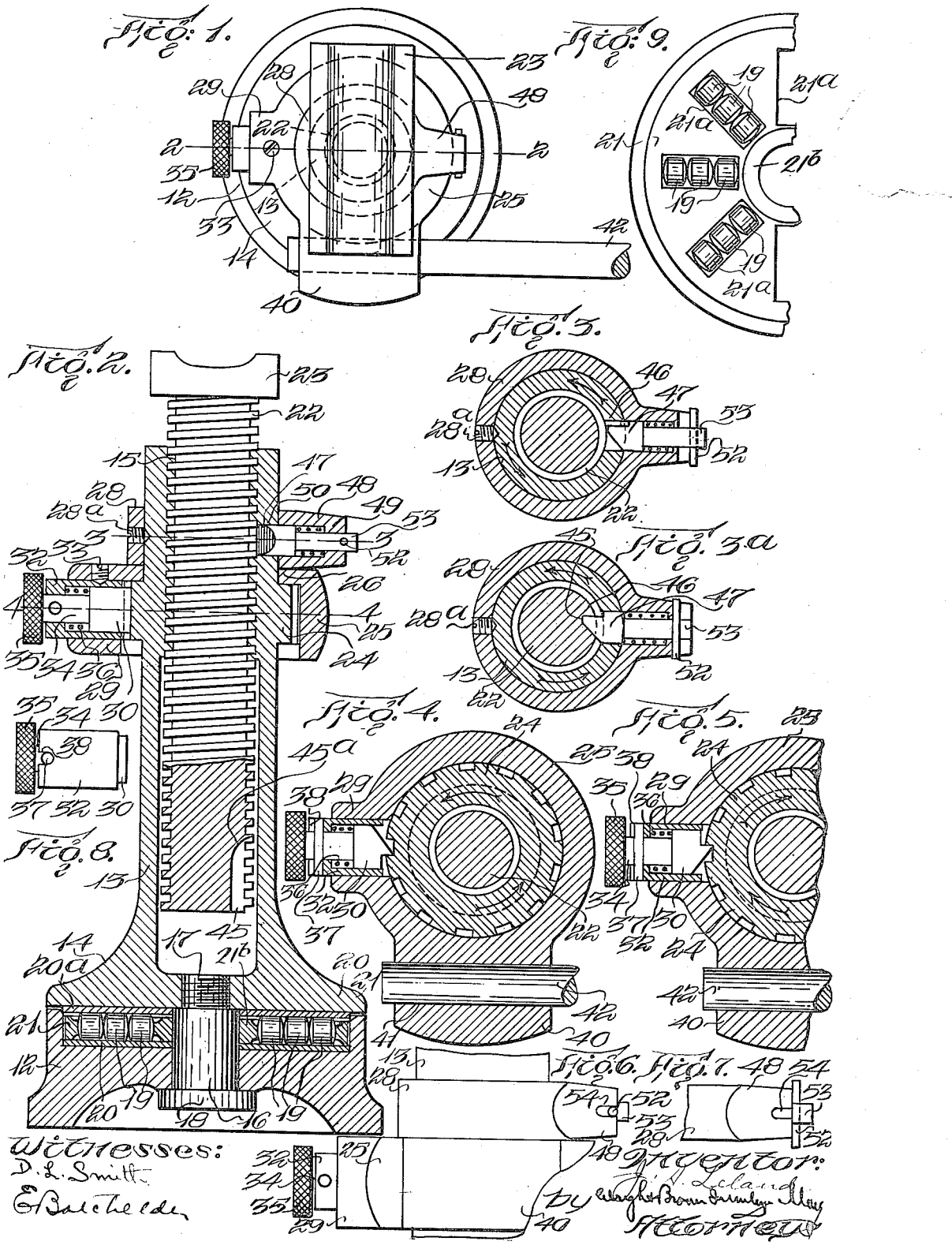

JOHN A. LELAND, OF MONTAGUE, MASSACHUSETTS, ASSIGNOR TO MILLERS FALLS COMPANY, OF MILLERS FALLS, MASSACHUSETTS, A CORPORATION OF MASSACHUSETTS.

JACK-SCREW.

1,153,697.   Specification of Letters Patent.   Patented Sept. 14, 1915.

Application filed August 28, 1914, Serial No. 859,047. Renewed August 6, 1915. Serial No. 44,118.

*To all whom it may concern:*

Be it known that I, JOHN A. LELAND, a citizen of the United States, and resident of Montague, in the county of Franklin and State of Massachusetts, have invented certain new and useful Improvements in Jack-Screws, of which the following is a specification.

This invention relates to jack screws adapted particularly for use with heavy vehicles such as motor trucks, and it has for its object to provide a powerful jack screw of simple construction, adapted to be conveniently operated, and comprising parts adapted to be quickly and conveniently assembled and separated.

The invention consists in the improvements which I will now proceed to describe and claim.

Of the accompanying drawings forming a part of this specification: Figure 1 represents a top plan view of a jack screw embodying my invention; Fig. 2 represents a section on line 2—2 of Fig. 1; Fig. 3 represents a section on line 3—3 of Fig. 2; Fig. 3ª represents a view similar to Fig. 3, showing the locking grooves hereinafter referred to in the lower portion of the lifting screw, brought into engagement with the locking dog; Fig. 4 represents a section on line 4—4 of Fig. 2; Fig. 5 represents a view similar to a portion of Fig. 4, the pawl shown by said figure being reversed; Fig. 6 represents a fragmentary side view, showing portions of the jack; Fig. 7 is a view similar to a portion of Fig. 6, showing the locking pawl held in a retracted position; Fig. 8 represents a side view of the bushing containing the jack-operating pawl removed from the jack; Fig. 9 represents a top view of a portion of the roller cage hereinafter referred to, and rollers confined thereby.

The same reference characters indicate the same or similar parts in all the views.

In the drawings, 12 represents a supporting pedestal which is preferably circular and relatively low in proportion to its diameter.

13 represents a tubular standard having an enlarged circular base 14 forming a turn-table, the under side of which is opposed to the top side of the pedestal. The standard 13 has an internal screw thread 15 at its upper portion and its turn-table base is connected with the pedestal by a pivot stud 16 which permits the turn-table and standard to rotate on an axis perpendicular to the pedestal, said stud having a reduced threaded end screwed into a tapped orifice in the pedestal base and a head 18 bearing on the bottom of the pedestal. Antifriction bearings are provided between the turn-table and pedestal, said bearings as here shown being rollers 19 supported by a hardened steel annular wear plate 20 resting on the bottom of a recess formed in the pedestal. The rollers are preferably confined in radial rows by an annular cage 21 loosely fitted in said recess and adapted to rotate about the stud 16, said cage having radial slots 21ª, each formed to contain a row of rollers and a hub 21ᵇ fitted to turn on the pivot stud 16, said stud being separable from the cage. A hardened steel annular wear plate 20ª is preferably interposed between the pedestal base and the rollers. The plates 20 and 20ª provide respectively an upwardly facing and a downwardly facing bearing face, said faces coöperating with the antifriction bearings.

I do not limit myself to the arrangement of the rollers in rows, it being obvious that the inner rollers of the rows may be omitted, the cage slots 21ª being formed to confine only one roller each. Said rollers interposed between the marginal portions of the pedestal and turn-table constitute an effective antifrictional support for the marginal portion of the turn-table. I prefer the arrangement of the rollers in rows as shown because said arrangement distributes the antifrictional support over a large area, the rollers being located at different distances from the axis of the turn-table.

22 represents a lifting screw, the thread of which engages the internal thread of the standard 13, said screw having a head 23 formed to engage an axle or other body to be lifted, said engagement preventing the rotation of the lifting screw.

The standard 13 is provided with a ratchet 24 which is fast on the standard and is preferably cast integral therewith, the upper end of the ratchet forming an outwardly projecting annular shoulder surrounding the standard. The teeth of the ratchet are preferably double-faced, as shown by Fig. 4, so that the ratchet and standard may be rotated in either direction.

25 represents a sleeve carrying a pawl 30 which engages and rotates the ratchet and standard. Said sleeve surrounds the ratchet and is rotatable thereon, and is provided with an inwardly projecting flange 26 (Fig. 2), bearing loosely on the shoulder formed by the upper end of the ratchet, and the lower end of the sleeve being open so that the sleeve may be applied to the ratchet by a downward movement bringing its flange 26 to a bearing on the said shoulder. A stop detachably secured to the standard 13 above the ratchet confines the sleeve 25 in its operative relation to the ratchet, and when removed permits the sleeve to be removed upwardly from the ratchet and standard. Said stop is preferably a collar 28 secured by a set screw 28ª to the standard, said collar being also adapted to support the locking pawl hereinafter described.

The sleeve 25 has a radial socket 29 in which the pawl 30 is movable toward and from the ratchet. Said pawl is preferably cylindrical and reversible, as shown by Figs. 4 and 5, so that it may be used to rotate the ratchet and standard in either direction. The pawl is preferably housed in a tubular bushing 32 fitted detachably in the socket 29 and secured thereto by a set screw 33 (Fig. 2). The pawl 30 has a reduced stem 34 slidable in a guiding orifice in the outer end of the bushing and provided with a knurled head 35, by which the pawl 30 may be rotated in the bushing. A spring 36 normally presses the pawl against the ratchet 24 and holds a transverse pin 37 engaged with the stem 34 against the inner ends of slots 38 in the outer end of the bushing, said pin and slots holding the pawl 30 in either of the positions shown by Figs. 4 and 5.

The sleeve 25 is provided with an ear 40 having a socket or orifive 41 which is arranged tangentially with reference to the periphery of the sleeve, as shown by Fig. 4. A straight elongated operating lever 42 is loosely fitted in the socket 40, and is movable endwise therein so that the greater portion of the lever may project from either end of the ear 40 and stand tangentially to the sleeve. The lever is therefore adapted to swing in limited spaces under a vehicle body where a radially arranged lever could not be conveniently operated.

When the jack is placed under a motor truck axle with the screw head 23 engaged with the axle and prevented from rotating thereby, oscillating movements of the standard 13, lever 42, sleeve 25, pawl 30, and ratchet 24, will rotate the standard 13 step by step in the direction required to raise the screw and axle, the pawl 30 being suitably adjusted for this purpose. When the pawl 30 is reversed from its screw raising adjustment said oscillating movements will cause rotation of the standard 25 in the direction required to lower the screw and axle.

The turn-table 14 having a diameter considerably in excess of the diameter of the standard 13 permits the employment of a suitable number of relatively large rollers adapted to adequately support a heavy weight and permit the free rotation of the standard, frictional resistance to such rotation being reduced to the minimum. The opposed faces of the pedestal and turn-table, which coöperate with the antifriction bearings, are located in horizontal planes wholly below the screw-containing body of the standard 13, so that said faces and the series of antifriction bearings may be extended or enlarged to any desired diameter without requiring a corresponding enlargement of the standard. The diameter of the standard is no greater than that required for strength and is not enlarged to provide an annular face or faces for coöperation with antifriction bearings. The pedestal and turn-table may therefore be and are made of much greater diameter than the standard. The diameter of the standard and the weight of the jack screw as a whole are therefore reduced to the minimum, and a very desirable degree of stability or absence of top-heaviness is imparted to the structure by the relatively large area of the pedestal and turn-table, and the location of these parts wholly below the standard, the center of gravity of the structure being much nearer the base than would be possible if the antifriction bearings and the opposed faces coöperating therewith were located above the lower ends of the standard and screw. The described separable connection between the pedestal and turn-table permits the convenient removal of worn or damaged rollers and their replacement by others.

To limit the screw-raising rotation of the standard 13 and prevent the screw 22 from being lifted entirely out of the standard, I provide the means next described.

In the lower end portion of the screw 22 is formed a short longitudinal groove 45 which extends through the lower end of the screw and has an inclined upper end 45ª intersecting the perimeter of the screw a short distance above its lower end so that the groove interrupts the continuity of only a few convolutions of the screw thread. One side of said groove is radially arranged and forms a ratchet tooth 46 (Fig. 3ª), the other side of the groove being obliquely arranged.

47 represents a locking dog formed to enter the groove 45 and coöperate with the tooth 46 in preventing rotation of the standard 13 in the direction indicated by the arrow (Figs. 3 and 3ª), when the screw 22 is prevented from rotating by engagement with an axle. The dog 47 is fitted to slide in a socket 48 formed on the stop sleeve 28, above described, and is pressed inwardly by a spring 49, the standard 13 being provided with an orifice 50 coinciding with the socket and receiving the dog 47. When the screw 22 is depressed as shown by Fig. 2, the locking dog 47 bears inoperatively against the thread of the screw and is held outwardly displaced thereby. When the elevation of the screw brings the groove 45 to the level of the dog the latter springs into the groove and arrests the screw-raising rotation of the standard, this being in the direction of the arrow (Fig. 3ª). The screw is therefore prevented from being raised out of engagement with the internal thread of the standard. The dog 47 has an oblique face conforming to the oblique face of the groove 45, so that the standard 13 may be rotated in the opposite, screw-lowering direction, without opposition by the dog, the latter being automatically and intermittently displaced outwardly by the oblique face of the groove 45 during the first screw-lowering turns of the standard until the groove passes below the dog and leaves the latter bearing on the continuous portion of the lifting screw thread. The locking dog is held in its operative position by the engagement of a pin 52 on the stem 53 of the dog, with slots 54 in the socket 48. Said dog may be confined in a retracted position to permit the withdrawal of the screw from the standard by turning its stem 53 to cause the pin 52 to bear on the outer end of the socket 48, as shown by Fig. 7.

The parts of the jack may be conveniently assembled by first placing the cage 21 and rollers 19 on the pedestal, then placing the turn-table and standard on the rollers, then inserting and securing the stud 16, then dropping the sleeve 25 upon the ratchet, then applying and securing the stop collar 28 (and at the same time locating the locking dog), and finally screwing the lifting screw into the standard.

The turn-table having a downwardly facing bearing face, the pedestal having an upwardly facing bearing face which is coextensive with the bearing face of the turn-table, and the interposed series of antifriction bearings substantially coextensive with said bearing face, constitute an antifrictional support the diameter of which is not limited by the diameter of the standard and may be of any greater diameter desired, so that the support is adapted to adequately resist strains tending to tip the standard in any direction, and at the same time permit free rotation of the standard.

Having described my invention, I claim:

1. A jack screw comprising a pedestal having an upwardly facing bearing face and a central stud bearing, a series of antifriction bearings supported by said face and practically coextensive therewith, a tubular internally threaded standard having an enlarged base forming a turn-table and provided with a downwardly facing bearing face coextensive with the bearing face of the pedestal and resting on said bearings, a central pivot stud detachably securing the turn-table to the pedestal and journaled in said stud bearing, said stud permitting the separation of the turn-table from the pedestal to render the antifriction bearings accessible, means for rotating the standard, and a lifting screw engaged with the internal thread of the standard, the said pedestal, turn-table and antifriction bearings forming an antifrictional support of greater diameter than the standard, permitting free rotation of the standard, and adapted to adequately resist strains tending to tip the standard in any direction.

2. A jack screw comprising a supporting pedestal, a tubular standard internally threaded at its upper portion and having a turn-table pivotally connected with the pedestal, a fixed ratchet surrounding the upper portion of the standard and fast thereon, a sleeve loosely surrounding the standard and ratchet and movably seated on the upper end of the ratchet, a spring-pressed pawl carried by the sleeve and engaging the ratchet, said sleeve being removable upwardly from the ratchet, an operating lever engaged with said sleeve, a stop detachably secured to the standard above the ratchet and sleeve, and confining the sleeve in its operative relation to the ratchet, and a lifting screw engaged with the internal thread of the standard.

3. A jack screw comprising a supporting pedestal, a tubular standard internally threaded at its upper portion and having a turn-table pivotally connected with the pedestal, a fixed ratchet surrounding the upper portion of the standard and fast thereon, a sleeve loosely surrounding the standard and ratchet and having a laterally projecting ear provided with a socket which is tangential to the sleeve and open at both ends, an operating lever slidable in said tangential socket and adapted to project from either end of said ear, a spring-pressed pawl carried by said sleeve and engaging the ratchet, and a lifting screw engaged with the internal thread of the standard.

4. A jack screw comprising a pedestal, a tubular standard rotatable on the pedestal and internally threaded at its upper end portion, means for rotating said standard, a lifting screw engaged with the internal thread of the standard and formed to be held from rotation by the body to be lifted, said screw being provided in its lower end portion with a groove interrupting the continuity of the thread, and a spring-pressed locking pawl engaged with the upper portion of the standard and adapted to bear inoperatively on the continuous portion of the lifting screw thread to enter said groove when the screw is raised to a predetermined height, said groove and pawl being formed to interlock and prevent a further screw-raising rotation of the standard when the pawl enters the groove, and having oblique faces formed to cause the automatic intermittent displacement of the pawl by the screw when the standard is reversely rotated.

5. A jack screw comprising a supporting pedestal, a tubular standard internally threaded at its upper portion and having a turn-table pivotally connected with the pedestal, a fixed ratchet surrounding the upper portion of the standard and fast thereon, a sleeve loosely surrounding the standard and ratchet and normally seated on the upper end of the ratchet, a spring-pressed pawl carried by the sleeve and engaging the ratchet, said sleeve being removable upwardly from the ratchet, an operating lever engaged with said sleeve, a collar detachably secured to the standard above the ratchet and constituting a stop confining the sleeve in its operative relation to the ratchet, said collar having a radial socket, and the standard having an orifice registering with said socket, a lifting screw engaged with the internal thread of the standard and formed to be held from rotation by the body to be lifted, said screw being provided in its lower end portion with a groove interrupting the continuity of the thread, and a spring-pressed locking pawl movable in said radial socket and in the standard orifice registering therewith, and adapted to bear inoperatively on the continuous portion of the lifting screw thread and to enter said groove when the screw is raised to a predetermined height and prevent a further screw-raising rotation of the standard.

6. A jack screw comprising a supporting pedestal provided with an annular upwardly facing bearing face, a tubular standard internally threaded at its upper portion and having an enlarged base forming a turntable provided with a downwardly facing bearing face located wholly below the body of the standard, a central pivot stud separably engaged with the pedestal and turntable and separably connecting the turntable with the pedestal, said stud extending across the space between said bearing faces, a roller cage having a hub adapted to turn on said stud, antifriction rolls confined by said cage between said bearing faces, means for rotating the standard, and a lifting screw engaged with the internal thread of the standard, the pivot stud being separable from the roller cage.

In testimony whereof I have affixed my signature, in presence of two witnesses.

JOHN A. LELAND.

Witnesses:
  Lizzie B. Strachan,
  Lena O. Perkins.